United States Patent [19]
Jain et al.

[11] Patent Number: 5,553,255
[45] Date of Patent: Sep. 3, 1996

[54] DATA PROCESSOR WITH PROGRAMMABLE LEVELS OF SPECULATIVE INSTRUCTION FETCHING AND METHOD OF OPERATION

[75] Inventors: Danny K. Jain; David S. Levitan; Paul C. Rossbach, all of Austin, Tex.

[73] Assignees: Motorola, Inc., Schaumburg, Ill.; International Business Machines, Armonk, N.Y.

[21] Appl. No.: 429,439

[22] Filed: Apr. 27, 1995

Related U.S. Application Data

[63] Continuation of Ser. No. 169,262, Dec. 20, 1993, abandoned.
[51] Int. Cl.⁶ .................................................. G06F 9/38
[52] U.S. Cl. ....................................... 395/375; 395/414
[58] Field of Search ..................................... 395/375, 414

[56] References Cited

U.S. PATENT DOCUMENTS

| 4,435,756 | 3/1984 | Potash | 395/375 |
|---|---|---|---|
| 4,860,199 | 8/1989 | Langendorf et al. | 395/421.03 |
| 4,943,908 | 7/1990 | Emma et al. | 395/375 |
| 4,984,154 | 1/1991 | Hanatani et al. | 395/375 |
| 5,093,778 | 3/1992 | Favor et al. | 395/375 |
| 5,136,697 | 8/1992 | Johnson | 395/375 |
| 5,163,140 | 11/1992 | Stiles et al. | 395/467 |
| 5,228,131 | 7/1993 | Veda et al. | 395/375 |
| 5,313,634 | 5/1994 | Eickemeyer | 395/700 |
| 5,454,117 | 9/1995 | Puziol et al. | 395/800 |

OTHER PUBLICATIONS

"Experiments with Low-Level Speculative Computation Based on Multiple Branch Prediction", Holtmann et al, IEEE, vol. 1, No. 3, Sep. 1993, pp. 262–267.

Primary Examiner—Parshotam S. Lall
Assistant Examiner—Viet Vu
Attorney, Agent, or Firm—Lee E. Chastain; Michael A. Davis

[57] ABSTRACT

A data processor (12) has a branch prediction unit (28) that predicts conditional branch instructions and a control unit (70) therein that monitors the number of unresolved branch instructions. This control unit selectively allows the data processor to fetch the instructions indicated by the branch prediction unit from an external memory system depending upon the number of unresolved branch instructions. The particular threshold number of unresolved branch instructions is user programmable. The data processor thereby limits its bus accesses to those occasions when it is reasonably sure that it will need the indicated instructions.

6 Claims, 5 Drawing Sheets

DATA PROCESSOR WITH PROGRAMMABLE LEVELS OF SPECULATIVE INSTRUCTION FETCHING AND METHOD OF OPERATION

This application is a continuation of prior application Ser. No. 08/169,262, filed Dec. 20, 1993, now abandoned.

FIELD OF THE INVENTION

The present invention generally relates to digital computing systems, and more specifically to a data processor with speculative instruction fetching capabilities.

BACKGROUND OF THE INVENTION

Branch prediction is one technique used to improve data processor performance. Data processors that use branch prediction techniques make a "guess" each time they receive a branch instruction, act on the guess (an "unresolved branch instruction"), and then determine if the guess was correct by completing the instruction (a "resolved branch instruction"). Such a data processor guesses whether a branch will ultimately be taken and jump to a new instruction address or whether it will "fall through" to the next sequential instruction. Data processors that predict branch instructions gain performance because they can make an accurate guess faster than they can complete the branch instruction. These data processors then need only correct wrong guesses.

Branch prediction techniques increase data processor performance by allowing the data processor to fetch the next instruction or group of instructions as soon as possible. The data processor thereby ensures that it has a continuous stream of instructions to execute at all times. This strategy is known as "instruction prefetching" because the data processor fetches the instruction before it executes the branch instruction that determines the address of the prefetched instruction.

In certain data processing systems, uniform instruction prefetching may be detrimental to the overall performance of the system. Oftentimes a data processor does not contain a prefetched instruction in its internal memory cache. In these cases, the data processor must access an external memory system to fetch the instruction. This operation monopolizes the bus associated with the external memory device and may cause other devices sharing the external memory device to perform certain actions consistent with a system memory coherency protocol ("snoop operations"). Also, the data processor can not request another, presumably correct instruction, until it receives the prior, incorrect instruction. It is advantageous to minimize the number of these operations whenever possible.

Each guessed branch instruction compounds the uncertainty in the selected instruction path, and thus the likelihood of an unnecessary fetch. For instance, a certain branch prediction scheme may predict branches correctly 90% of the time and incorrectly 10% of the time. After three predicted and unresolved branches, there may be only a 73% chance that the data processor is fetching instructions along the correct instruction stream path. Continuing with this example, known data processors treat the first and the third branch prediction guesses equally, either prefetching instructions at the addresses indicated by both branch instructions (or at sequential addresses generated after both instructions) or prefetching no instructions. As described above, each of these two instructions may cause the data processor to access an external memory system via a system bus if the data processor does not contain the particular instruction returned by the branch instruction. All other things being equal, it is less desirable to monopolize the system bus to fetch the third instruction than to fetch the first instruction. However, known data processors do not make this distinction.

SUMMARY OF THE INVENTION

In accordance with the present invention, there is disclosed a data processor with speculative instruction fetching which substantially eliminates disadvantages of known data processors.

A data processor for use with an external memory system has a branch prediction unit and an instruction fetch circuitry coupled together. The branch prediction unit generates a fetch address, stores a signal representative of a number of previously unresolved branch instructions, and generates a control signal. The control signal corresponds to a first logic state and to a second logic state if the signal is representative of a number less than or equal to a first preselected number or greater than the first preselected number, respectively, in a first mode of operation. The control signal corresponds to the first logic state and to the second logic state if the signal is representative of a number less than or equal to a second preselected number or greater than the second preselected number, respectively, in a second mode of operation. The instruction fetch circuitry fetches an instruction indexed by the fetch address from an external memory system responsive to the first state of the control signal.

A method of operating a data processor with an external memory system is also described. The method has the steps of, in a branch prediction unit, receiving a branch instruction, predicting a fetch address responsive to the branch instruction, storing the number of unresolved branch instructions, and generating a control signal. The control signal corresponds to a first logic state and to a second logic state if the number of unresolved branch instructions is less than or equal to a first preselected number or greater than the first preselected number, respectively, in a first mode of operation. The control signal corresponds to the first logic state and to the second logic state if the number of unresolved branch instructions is less than or equal to a second preselected number or greater than the second preselected number, respectively, in a second mode of operation. The method also has the steps of, in an instruction fetch circuitry coupled to the branch prediction unit, fetching instructions from the external memory system responsive to the control signal.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 1:
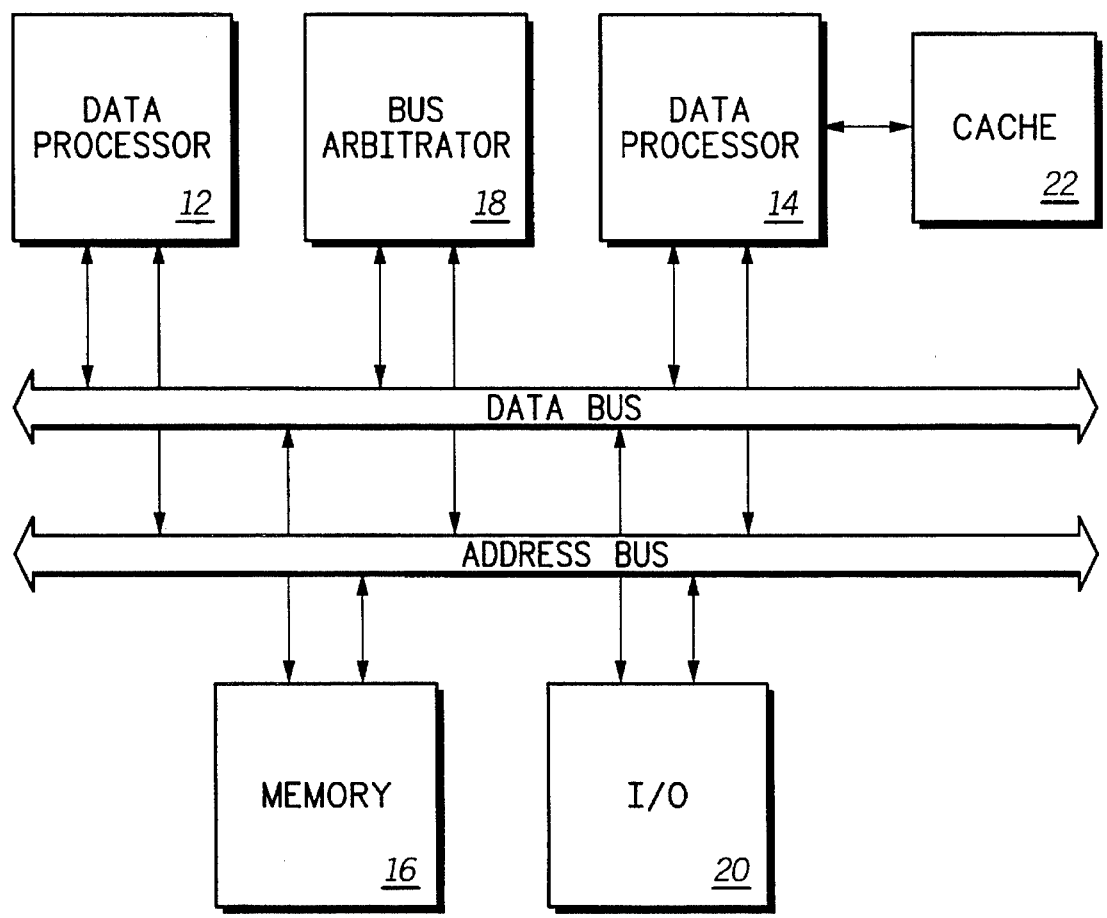
FIG. 1 depicts a block diagram of a data processing system constructed in accordance with the present invention.

FIG. 1 depicts a block diagram of a data processing system 10 constructed in accordance with the present invention. Data processing system 10 has a first data processor block 12, a second data processor block 14, a main memory block 16, a bus arbitration block 18 and an input/output block 20 (labeled and hereafter I/O) interconnected via an address bus and a data bus. As depicted, second data processor block 14 has an external cache memory block 22 (typically a secondary or "L2" cache). Data processors 12 and 14 predict branch instructions and speculatively prefetch instructions identified by the addresses returned by the branch unit 28. Branch unit 28 generates fetch addresses in any order responsive to received branch instructions and sequentially in the absence of any branch instructions. However, data processors 12 and 14 selectively prefetch instructions responsive to user programmable bits. Each data processor prefetches instructions depending upon how many unresolved branch instructions exist at the time a particular fetch address is generated. Each data processor thereby limits the number of times it accesses main memory block 16 via the address and data buses when, for instance, there is a high probability that the branch guess will be incorrect.

The disclosed invention makes a single data processor perform better in both a uni-processor (not shown) and multi-processor (MP) data processing system (shown). In the uni-processor environment, the one data processor may be the only main memory user. In this case, an incorrect fetch will only delay the uni-processor from fetching the correct instruction. Conversely, in the MP environment, an incorrect fetch will delay one of the processors from fetching the correct instruction and will exclude other processors from using the common bus. A data processor incorporating the disclosed invention may be programmed to operate optimally in either data processing system.

Many of the functions of the blocks depicted in FIG. 1 are known in the art. Data processor blocks 12 and 14 execute instructions stored in main memory block 16 using data stored in main memory block 16 and received through I/O block 20. I/O block 20 may provide an interface from data processing system 10 to a keyboard, a disk drive, an electronic network, etc. Bus arbitrator block 18 receives requests from the other various blocks of data processing system 10 for exclusive use of the data and or address buses. Bus arbitrator block 18 grants these requests according to a protocol not relevant to the disclosed invention. Data processor block 14 stores frequently used data in cache block 22.

Figure 2:
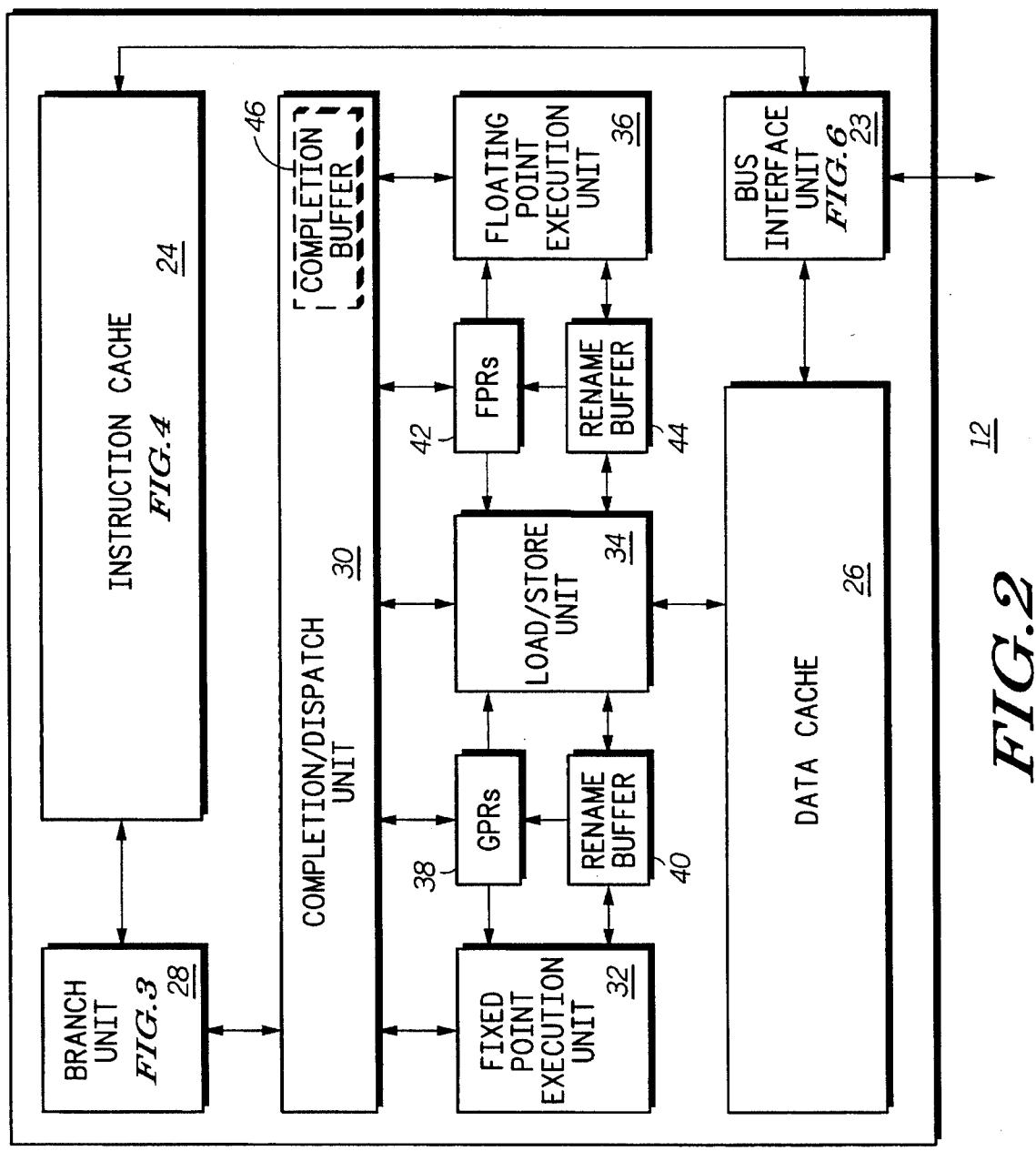
FIG. 2 depicts a block diagram of the data processor depicted in FIG. 1.

FIG. 2 depicts a block diagram of data processor 12 depicted in FIG. 1. Data processors 12 and 14 are substantially similar. Therefore, the following Detailed Description of a Preferred Embodiment will describe data processor 12 in detail and, where necessary, will highlight the differences of data processor 14.

Continuing with FIG. 2, a bus interface unit (hereafter BIU) 23 controls the flow of data between data processor 12 and the remainder of data processing system 10. BIU 23 is connected to an instruction cache 24 and to a data cache 26. Instruction cache 24 supplies an instruction stream to a branch unit 28 and to a completion/dispatch unit 30. Completion/dispatch unit 30 forwards individual instructions to an appropriate execution unit. Data processor 12 has a fixed point execution unit 32, a load/store execution unit 34, and a floating point execution unit 36. Fixed point execution unit 32 and load/store execution unit 34 read and write their results to a general purpose architectural register file 38, (labeled GPRs and hereafter GPR file) and to a first rename buffer 40. Floating point execution unit 36 and load/store execution unit 34 read and write their results to a floating point architectural register file 42, (labeled FPRs and hereafter FPR file) and to a second rename buffer 44.

The operation of data processor 12 without the disclosed speculative instruction prefetch methodology is known in the art. In general, BIU 23 communicates with data processing systems 10. BIU 23 is more fully described below in connection with HG. 6. Branch unit 18 determines what sequence of programmed instructions is appropriate given the contents of certain data registers and the program steps themselves. Branch unit 18 is more fully described below in connection with FIG. 3. Branch unit 38 first attempts to fetch instructions from instruction cache 24. If the requested instruction is not stored in instructions cache 24, then instruction cache 24 will send a request to BIU 23 to fetch the requested instruction from main memory 16. Instruction cache 24 is more fully described below in connection with FIGS. 4 and 5. Completion/dispatch unit 30 issues the individual instructions to the various execution units 32, 34 and 36. Each of the execution units performs one or more instructions of a particular class of instructions. The particular class of instructions of each execution unit is indicated by the name of the execution unit. For instance, floating point execution unit 36 executes floating point arithmetic instructions.

Fixed point execution unit 32 returns the results of its operations to designated entries in first rename buffer 40. First rename buffer 40 periodically updates an entry of GPR file 38 with an entry from first rename buffer 40 when all instructions preceding the instruction that generated the result have updated their GPR or FPR file entries. Completion/dispatch unit 30 coordinates this updating by maintaining a list of all executing instructions in a completion buffer 46. Both first rename buffer 40 and GPR file 38 can supply operands to fixed point execution unit 32. Conversely, floating point execution unit 36 returns the results of its operations to designated entries in second rename buffer 44. Second rename buffer 44 periodically updates an entry of FPR file 42 with an entry in second rename buffer 44 when all instructions preceding the instruction that generated the result have updated their GPR or FPR file entries. Completion/dispatch unit 30 also coordinates this updating. Both second rename buffer 44 and FPR file 42 supply operands to floating point execution unit 36.

Load/store unit 34 reads data stored in GPR file 38, first rename buffer 40, FPR file 42 or second rename buffer 44 and writes the selected data to data cache 26. This data may also be written to a main memory system 16 depending upon operating characteristics of data processor 12 not relevant to the disclosed invention. Conversely, load/store unit 34 reads data stored in data cache 26 and writes the read data to GPR file 38, first rename buffer 40, FPR file 42 or second rename buffer 44.

The operation of data processor 12 with the disclosed speculative instruction prefetch methodology is described below in connection with FIGS. 3 through 6. In general, data processor 12 is a reduced instruction set computer ("RISC"). Data processor 12 achieves high performance by breaking each instruction into a sequence of smaller steps, each of which may be overlapped in time with steps of other instructions. This performance strategy is known as "pipe lining." Data processor 12 also achieves high performance by combing static and dynamic branch prediction methodologies. Data processor 12 may operate in either a static or a dynamic branch prediction mode responsive to user programmable bits. Further, when in the static branch prediction mode, data processor 12 may or may not update the branch state of each branch instruction in a branch history table according to one of the programmable bits.

In the depicted embodiment, each instruction is broken into as many as five discrete steps: fetch, dispatch, execute, write-back, and completion. Memory management circuitry (not shown) within instruction cache 24 retrieves one or more instructions beginning at a memory address identified by branch unit 28 during the fetch phase. Completion/dispatch unit 30 routes each instruction to the appropriate execution unit after determining that there are no impermissible data dependencies and after reserving a rename buffer entry for the result of the instruction in the dispatch phase. Each particular execution unit executes its programmed instruction during the execution phase and writes its result, if any, to the reserved rename buffer entry during the write-back phase. Finally, completion/dispatch unit 30 updates the architectural register files with the result of a particular instruction stored in a rename buffer after every instruction preceding the particular instruction has so updated the architectural register file. Generally, each instruction phase takes one machine clock cycle. However, some instructions require more than one clock cycle to execute while others do not require all five phases. There may also be a delay between the write-back and completion phases of a particular instruction due to the range of times which the various instructions take to complete.

Figure 3:
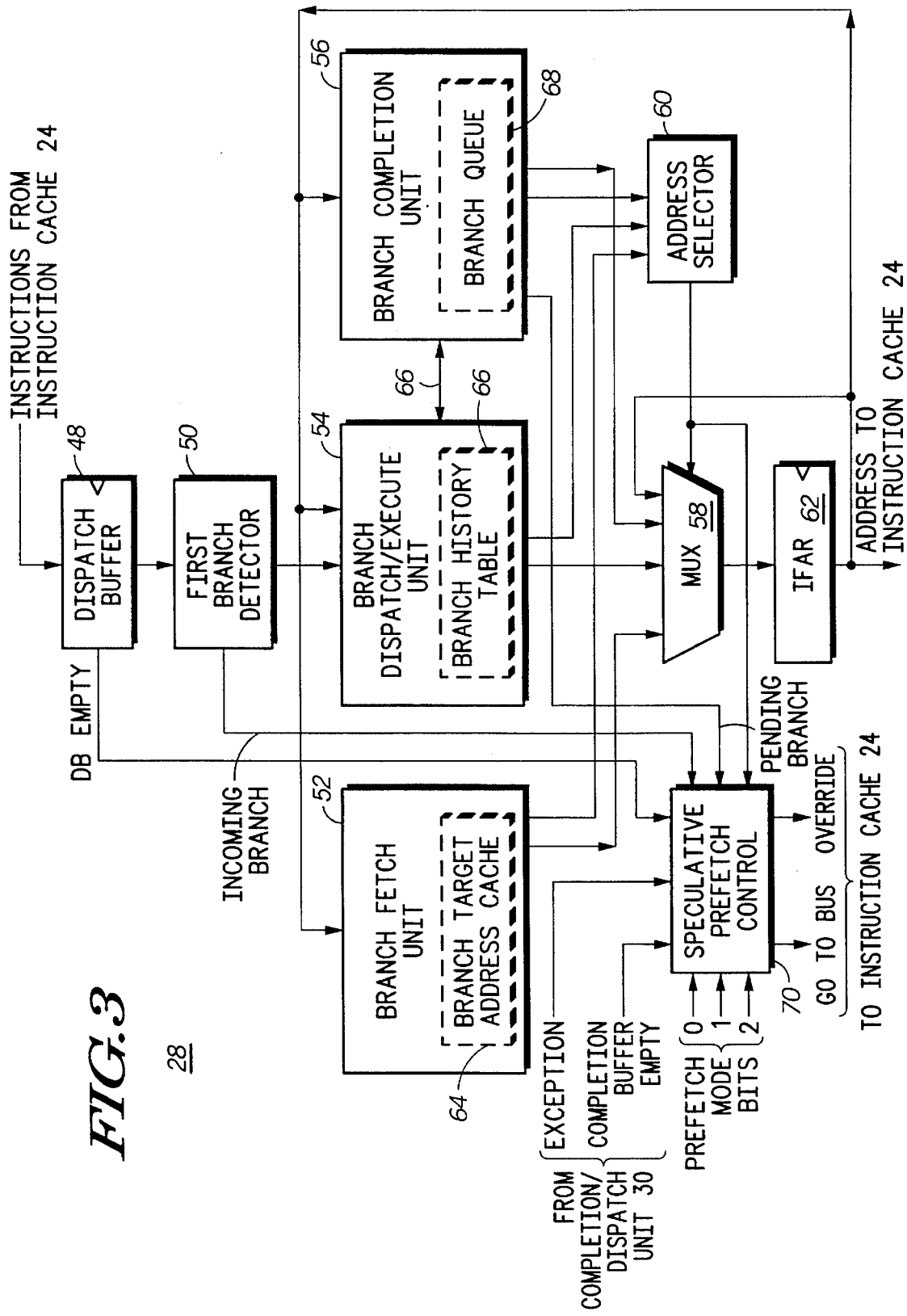
FIG. 3 depicts a block diagram of the branch unit depicted in FIG. 2.

FIG. 3 depicts a block diagram of branch unit 28 depicted in FIG. 2. Branch unit 28 generates the address of the next instruction to fetch from memory (labeled ADDRESS TO INSTRUCTION CACHE 24) and receives the next instruction fetched from instruction cache 24 (labeled INSTRUCTIONS FROM INSTRUCTION CACHE 24). Branch unit 28 also generates the control signals GO TO BUS and OVERRIDE that determine whether data processor 12 should access the address and data buses to fetch instructions not stored in instruction cache 24.

Branch unit 28 latches the received instructions in a dispatch buffer 48. In the depicted embodiment, branch unit 28 receives four instructions each clock cycle: the instruction residing at the forwarded address (the fetch address) and the three instructions residing at the three addresses following the fetch address. Dispatch buffer 48 generates the control signal DB EMPTY. Dispatch buffer 48 asserts DB EMPTY when dispatch buffer 48 is empty. A first branch detector 50 identifies the first branch instruction, if any, within each group of four latched instructions. First branch detector 50 generates the control signal INCOMING BRANCH. First branch detector 50 asserts INCOMING BRANCH when dispatch buffer 48 contains one or more branch instructions.

The address of the first instruction latched in dispatch buffer 48 is forwarded to a branch fetch unit 52, to a branch dispatch/execute unit 54 and to a branch completion unit 56. Branch fetch unit 52, branch dispatch/execute unit 54 and branch completion unit 56 each generate an address from which the next instruction should be fetched, though during different instruction phases. Branch dispatch/execute unit 54 also receives the output of first branch detector 50. The operation of these three units is described below. A multiplexer 58 (labeled MUX) outputs one of the three memory addresses responsive to an address selector 60. Address selector 60 receives control signals from branch fetch unit 52, branch dispatch/execute unit 54 and branch completion unit 56, which it decodes to determine which of the three memory addresses it should output. An instruction fetch address register 62 (labeled and hereafter IFAR) latches the output of multiplexer 58. IFAR 62 generates the signal labeled ADDRESS TO MEMORY.

Branch fetch unit 52 calculates two new fetch addresses for a particular branch instruction as soon IFAR 62 latches a current fetch address. This calculation occurs during the particular branch instruction's fetch phase. The particular instruction(s) indexed by the fetch address are not yet known during their fetch phase. Branch fetch unit 52 outputs one of these two addresses to multiplexer 58. The first address is output when the branch instruction associated with the current fetch address is assumed not taken or "falls through" to the next sequential instruction. The second address is output when the branch instruction associated with the current fetch address is assumed taken or the instruction stream "jumps" to a new location.

Branch fetch unit 52 has two internal pipelines that each calculate one of these two new fetch addresses. The first branch fetch unit pipeline calculates a sequential address by incrementing the address latched by IFAR 62. In the described embodiment, this first branch fetch unit pipeline adds four instruction lengths to the contents of IFAR 62. The second branch fetch unit pipeline uses a portion of the contents of IFAR 62 to index a first block of random access memory (RAM) cache, called a branch target address cache 64 (hereafter BTAC). In the depicted embodiment, branch fetch unit 52 stores the branch target addresses (the fetch addresses) and a subset of the address of the branch instructions associated with the fetch addresses for a number of recent branch instructions in BTAC 64.

In the depicted embodiment, BTAC 64 is a two-way set associative cache. BTAC 64 uses a subset of the address latched in IFAR 62 to index two entries in BTAC 64. Branch fetch unit 60 then compares the remaining bits of the index address to a subset of address bits stored in each of the two indexed entries of BTAC 64. If one of the comparisons match, then a BTAC "hit" occurs and branch fetch unit 52 outputs the "branch-taken" fetch address associated with the matching subset of address bits. If neither of the two comparisons match, then a BTAC "miss" occurs and branch fetch unit 60 outputs the incremented contents of IFAR 62, the "branch-not-taken" fetch address, to multiplexer 58.

Branch dispatch/execute unit 54 calculates two fetch addresses as soon as it receives the particular instructions indexed by the contents of IFAR 62 and first branch detector 50 identifies the first branch instruction, if any, in the four fetched instructions. Branch dispatch/execute unit 54 calculates the two addresses for a particular branch instruction during the particular instruction's dispatch phase. These two fetch addresses correspond to the branch-not-taken and branch-taken conditions. Branch dispatch/execute unit 54 outputs only one of these two addresses to multiplexer 58. It should be noted that branch fetch unit 52 has already output a new fetch address based on the same branch instruction to multiplexer 58 in the pipeline stage. Depending upon the outcome of branch instructions that are simultaneously executing in either branch dispatch/execute unit 54 or branch completion unit 56, IFAR 62 may be loaded with the output of one of these two units. In this case, data processor 12 will be fetching instructions beginning at this address.

Branch dispatch/execute unit 54 also has two internal pipelines to calculate its two fetch addresses. The first pipeline calculates a sequential address by incrementing the branch instruction address by one instruction. First branch detector 50 calculates the first branch instruction address, if any, in every group of four fetched instructions The second branch dispatch/execute unit pipeline calculates the fetch address according to the particular branch instruction. For instance, this pipeline may add an offset embedded in the instruction to the branch instruction address. A branch prediction logic unit (not shown) selects which of the two addresses branch dispatch/execute unit 54 will output to multiplexer 58. The branch prediction logic unit operates in one of three modes responsive to user-programmable control bits: (1) dynamic branch prediction; (2) static-branch-prediction-with-BHT-update; and (3) static-branch-prediction-without-BHT-update.

Whether a branch instruction is taken or not is independent of where the branch jumps if it is taken. Conditional branch instructions are a class of branch instructions that depend upon an instruction result that is usually not known during the dispatch/execute phase of the branch instruction. This dependency determines if the branch is to be taken or not. It does not determine what the fetch address is. Therefore, branch dispatch/execute unit 54 selects one of its two addresses according to a dynamic branch prediction methodology or to a static branch prediction methodology. The specific prediction methodology is user controllable by setting certain bits in a special purpose register (not shown).

While operating according to the dynamic branch prediction methodology, branch dispatch/execute unit 54 uses a portion of the contents of IFAR 62 to index a second block of RAM called a branch history table 64 (hereafter BHT). Branch dispatch/execute unit 54 defines a branch state for each branch instruction or for some subset of branch instructions. The state of a particular branch instruction determines if the branch is taken or not taken. The branch state model for the depicted embodiment is a four-state model known in the art: STRONG-NOT-TAKEN, WEAK-NOT-TAKEN, WEAK-TAKEN and STRONG-TAKEN. Branch dispatch/execute unit 54 predicts that a branch will not be taken if the instruction's branch state corresponds to STRONG-NOT-TAKEN or WEAK-NOT-TAKEN. Branch dispatch/execute unit 54 predicts that a branch will be taken if the instruction's branch state corresponds to STRONG-TAKEN or WEAK-TAKEN. Branch dispatch/execute unit 54 updates the branch state of a particular branch instruction after the instruction completes. If branch dispatch/execute unit 54 incorrectly predicted the branch instruction, then branch dispatch/execute unit 54 will update the corresponding entry in BHT 66 from one strong state to the same weak state or from one weak state to the opposite weak state. Conversely, if branch dispatch/execute unit 54 correctly predicted the branch instruction, then branch dispatch/execute unit 54 will update the corresponding entry in BHT 66 from one weak state to the same strong state or from one strong state to the same strong state.

While operating according to the static branch prediction methodology, branch dispatch/execute unit 54 uses one or more bits embedded in the branch instruction itself to determine if the branch is taken or not. These bits are set once when the program containing the branch instruction is compiled. In the depicted embodiment, two bits are used to predict branch instructions in the static branch prediction mode. One of these bits is a sign bit indicating, generally, whether the second pipeline in branch dispatch/execute unit 54 adds two numbers to generate a fetch address or subtracts two numbers to generate the fetch address (a forward branch or a backward branch). The second bit is a branch prediction bit that indicates whether the branch should be taken or not. The relationship between the logic state of the branch prediction bit and the resulting action reverses when the sign bit is toggled. Regardless, the sign bit and the branch prediction bit decode to a single taken/not-taken bit. If the single taken/not-taken bit is logically equivalent to a first state, then branch prediction logic unit will select the address generated by the first pipeline in branch dispatch/execute unit 54. ff the single taken/not-taken bit is logically equivalent to a second state, then branch prediction logic unit will select the address generated by the second pipeline in branch dispatch/execute unit 54.

Branch dispatch/execute unit 54 may or may not update BHT 66 while it is operating according to the static branch prediction methodology. The decision to update BHT 66 or not to update BHT 66 may be a strategic decision.

Branch completion unit 56 generates a single address for a particular branch instruction after the particular branch instruction is completed. A branch instruction, like any other instruction, is completed when all instructions preceding the branch instruction have written their results to the appropriate architectural register. By this time, the condition on which the branch instruction is based and, hence, whether the branch should be taken or should be not taken is known. It should be noted that branch fetch unit 52 has already output an instruction fetch address based on the same branch instruction to multiplexer 58 in the fetch phase of the same branch instruction and that branch dispatch/execute unit 54 may have output a second instruction fetch address to multiplexer 58 in the dispatch/execute phase of the same instruction.

Branch completion unit 56 has within it a first-in-first-out queue, or a branch queue 68 in which it stores data about each executed branch instruction. Branch completion unit 56 receives certain data about each instruction from branch dispatch/execute unit 55 through a set of data/control signals 66:(1) the fetch address generated by branch dispatch/execute unit 54 but not output to multiplexer 58 (the "not selected path"); (2) the predicted value of the condition on which the branch was calculated during the dispatch/execute phase; and (3) the branch state of the branch instruction. Branch completion unit 56 also stores the address of each branch instruction in branch queue 68. Branch completion unit 56 receives a control signal from completion/dispatch unit 20 indicating when each branch instruction completes.

After a branch instruction completes, branch completion unit 56 receives the actual value of the branch condition on which the dispatch/execute fetch address was based (The branch instruction is "resolved."). Typically this condition is a bit in a special purpose register (a condition register) that may be modified by other instructions. If the actual value of the condition differs from the predicted value stored in branch queue 68, then the branch prediction made by branch dispatch/execute unit 54 was wrong. In this case, branch completion unit 56 outputs the stored address associated with the branch instruction. This address is the path that was originally not selected by branch dispatch/execute unit 54. If the actual value of the condition is the same as the predicted value stored in branch queue 68, then the branch prediction made by Branch dispatch/execute unit 54 was correct. In this case, branch completion unit 56 does not need to do anything except invalidate the entry in branch queue 68 associated with the complete branch instruction for future use. In either case, branch completion unit 56 generates a new branch state for the branch instruction based on the comparison of the predicted and actual branch conditions and on the stored branch state. Branch completion unit 56 forwards the new branch state to BHT 66 using the stored branch address as an index to BHT 66. Branch completion unit 56 generates the control signal PENDING BRANCH. PENDING BRANCH indicates how many, if any, unresolved branch instructions are in branch queue 68.

Address selector 60 determines which of up to four output addresses it should cause multiplexer 58 to output to IFAR 62. Address selector 60 receives the fetch address output from branch fetch unit 52, the fetch address output from branch dispatch/execute unit 54 and a control signal from branch completion unit 56. Branch completion unit 56 asserts this control signal if the predicted value of the condition and the actual value of the condition differ. If branch completion unit 56 asserts its control signal, then address selector 60 causes multiplexer 58 to output the address generated by branch completion unit 56. If branch completion unit 56 does not assert its control signal and the address generated by branch dispatch/execute unit 54 differs from the address generated by branch fetch unit 52 during the previous pipeline stage, then address selector 60 causes multiplexer 58 to output the address generated by branch dispatch/execute unit 54. Otherwise, address selector 60 causes multiplexer 58 to output the address generated by branch fetch unit 52. Address selector outputs the previous value of IFAR 62 if branch unit 28 is stalled. It should be understood that address selector 60 may be selecting one of up to four different addresses generated by four different branch instructions at any given moment.

A speculative prefetch control unit 70 receives the control signals EXCEPTION and COMPLETION BUFFER EMPTY from completion/dispatch unit 30, DB EMPTY from dispatch buffer 48, INCOMING BRANCH from first branch detector 50, PENDING BRANCH from branch completion unit 56, the output of address selector 60 and three prefetch mode bits. A special purpose register, accessible to the programmer, generates the three mode bits. Speculative prefetch control unit 70 generates the control signals GO TO BUS and OVERRIDE.

Completion/dispatch unit 30 asserts EXCEPTION during the write back phase of an instruction that generates an exception. When an instruction generates an exception, data processor 12 immediately branches to an address in memory where an exception handling routine resides. In these cases, data processor 12 will not execute the instructions indexed by IFAR 62 so it need not prefetch these instructions. Otherwise, completion/dispatch unit 30 de-asserts EXCEPTION. Completion/dispatch unit 30 asserts COMPLETION BUFFER EMPTY when completion buffer 46 is empty. Otherwise, completion/dispatch unit 30 de-asserts COMPLETION BUFFER EMPTY.

The first or "zeroth" prefetch mode bit indicates whether data processor 12 is in a real or virtual addressing mode. In the real addressing mode, data processor 12 directly uses addresses it generates to index memory locations. In the virtual addressing mode, data processor 12 first translates its addresses before it indexes memory locations. The second and third prefetch mode bits indicate the number of permissible branch instructions beyond which data processor 12 may prefetch instructions. If these two bits correspond to "00," to "01," to "10," or to "11," then data processor 12 will prefetch instructions only if there are no pending branch instructions in branch queue 68, only if there is no more than one pending branch instruction in branch queue 68, only if there are no more than two pending branch instructions in branch queue 68, and only if there are no more than four pending branch instructions in branch queue 68, respectively. In all four of these modes, first branch detector 50 must de-assert INCOMING BRANCH.

Speculative prefetch control unit 70 asserts the controls signal GO TO BUS when it is appropriate for data processor 12 to prefetch instructions (and if the requested instructions are not in instruction cache 24). When the zeroth prefetch mode bits is set to a high logic state (real addressing mode), speculative prefetch control unit 70 asserts GO TO BUS when dispatch buffer 48 asserts DB EMPTY and completion/dispatch unit 30 asserts COMPLETION BUFFER EMPTY. Otherwise, speculative prefetch control unit 70 de-asserts GO TO BUS. When in the real addressing mode, data processor 12 may accidentally access address space which will forever change once accessed (certain I/O devices). Therefore, data processor 12 must not access this address space speculatively. When the zeroth prefetch mode bit is set to a low logic state (virtual addressing mode), speculative prefetch control unit 70 asserts GO TO BUS when first branch detector 50 de-asserts INCOMING BRANCH and PENDING BRANCH is less than or equal to the value represented by the second and third prefetch mode bits. Otherwise, speculative prefetch control unit 70 de-asserts GO TO BUS.

Speculative prefetch control unit 70 asserts the controls signal OVERRIDE when branch unit 28 loads a new fetch address into IFAR 62 that preempts an earlier pipeline stage output. In this case, the previous fetch address is no longer needed. Speculative prefetch control unit 70 asserts OVERRIDE when address selector 60 selects a fetch address from either the output of branch dispatch/execute 54 or the output of branch completion unit 56. Speculative prefetch control unit 70 de-asserts OVERRIDE when address selector 60 selects the fetch address from the output of IFAR 62 or the output of branch fetch unit 52.

Figure 4:
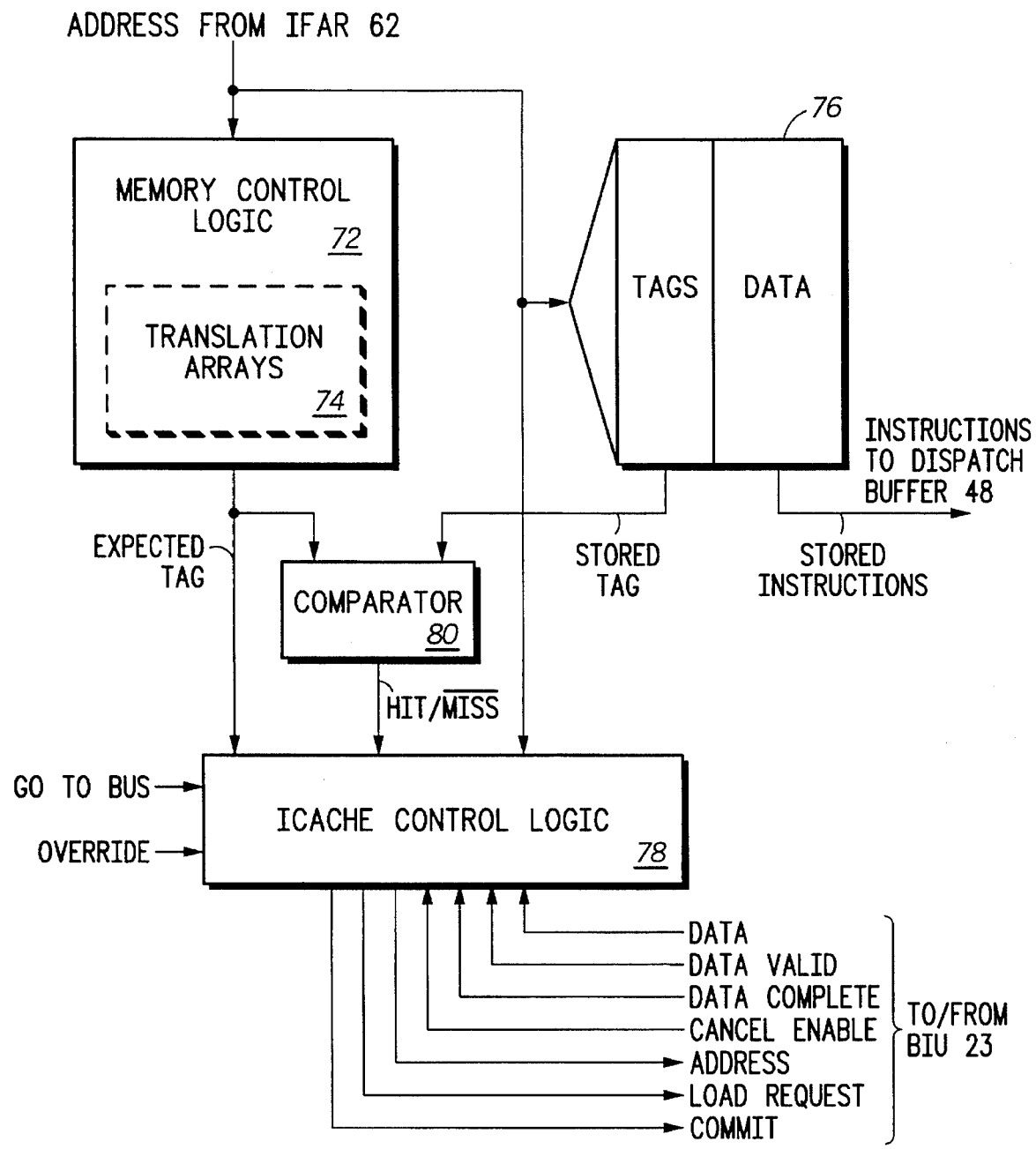
FIG. 4 depicts a block diagram of the instruction cache depicted in FIG. 2.

FIG. 4 depicts a block diagram of instruction cache 24 depicted in FIG. 2. Instruction cache 24 has a memory control logic unit 72 with a translation array 74, a block of cache random access memory ("RAM") 76, an ICACHE control logic unit 78 and a comparator 80.

Memory control logic unit 72 receives the most significant bits of a virtual address from IFAR 62. Translation array 74 translates the received most significant bits of the virtual address into a physical address when combined with the un-translated least significant bits of the virtual address. Memory control logic unit 72 outputs its translated most significant bits as a control signal EXPECTED TAG. Memory control logic unit 72 does not translate the received virtual address while in the real mode. In this mode, memory control logic unit 72 simply passes the received address to comparator 80 and ICACHE control logic 78.

Cache 76 stores a plurality of pairs of data and associated tags of frequently used instructions. Cache 76 receives the least significant bits of the virtual address generated by IFAR 62 and indexes one pair of instruction data and tag. The indexed tag is logically equivalent to the most significant bits of the physical address of the original address of the stored instruction data.

Comparator 80 receives the indexed stored tag from cache 76 and EXPECTED TAG from memory control logic unit 72. If these two multi-bit signals are identical, then the instruction indexed by the contents of IFAR 62 is present in instruction cache 24. Data processor 12 does not have to fetch the instructions from main memory block 16. In this case, comparator 80 asserts a control signal HIT/$\overline{\text{MISS}}$. If these two multi-bit signals are not identical, then the instruction indexed by the contents of IFAR 62 is not present in instruction cache 24. In this case, comparator 80 de-asserts a control signal HIT/$\overline{\text{MISS}}$. Also, data processor 12 will have to fetch this instruction from main memory block 16. It is the timing of this fetch operation to which the disclosed invention relates.

ICACHE control logic unit 78 controls the interface of instruction cache 16 to BIU 23. In particular, ICACHE control logic unit 78 forwards requests for instructions to BIU 23, receives requested instructions from BIU 23, and stores the received instructions in cache 76 (path not shown). ICACHE control logic unit 78 generates the control signals ADDRESS, LOAD REQUEST, and COMMIT, and receives the control signals DATA, DATA VALID, DATA COMPLETE and CANCEL ENABLE from BIU 23. ICACHE control logic unit 78 also receives GO TO BUS and OVERRIDE from branch unit 28, EXPECTED TAG from memory control logic unit 72, HIT/$\overline{\text{MISS}}$ from comparator 80, and the virtual address of the of the requested instructions from IFAR 62.

ICACHE control logic unit 78 concatenates the EXPECTED TAG and the least significant bits of the contents of IFAR 62 to generate ADDRESS, the address of an instruction not stored in instruction cache 24. ICACHE control logic unit 78 asserts LOAD REQUEST when it has a valid request for an instruction. ICACHE control logic unit 78 asserts COMMIT when it is appropriate that the request be broadcast to main memory block 16. LOAD REQUEST and COMMIT are described below in connection with FIG. 5. DATA contains a requested instruction from main memory block 16. DATA VALID indicates that the data present on DATA is valid. BIU 23 asserts DATA COMPLETE as it transmits the final beat of instruction data to instruction cache 24. CANCEL ENABLE indicates that ICACHE control logic unit 78 may cancel a request.

CANCEL ENABLE is useful in embodiments, such as depicted in FIG. 1, where data processor 14 requests data from an external cache 22 before it requests data from main memory unit 16. In this embodiment, external cache 22 and the main memory unit 16 are accessed via separate buses or pairs of buses. In this embodiment, data processor 14 only monopolizes the common address and data buses if the requested instruction is not in external cache 22. As described above, branch unit 28 occasionally determines that it does not need a requested instruction. In these cases, ICACHE control logic unit 78 will de-assert LOAD REQUEST if data processor 14 has searched external cache 22 but not accessed main memory unit 16 for a requested instruction.

Figure 5:
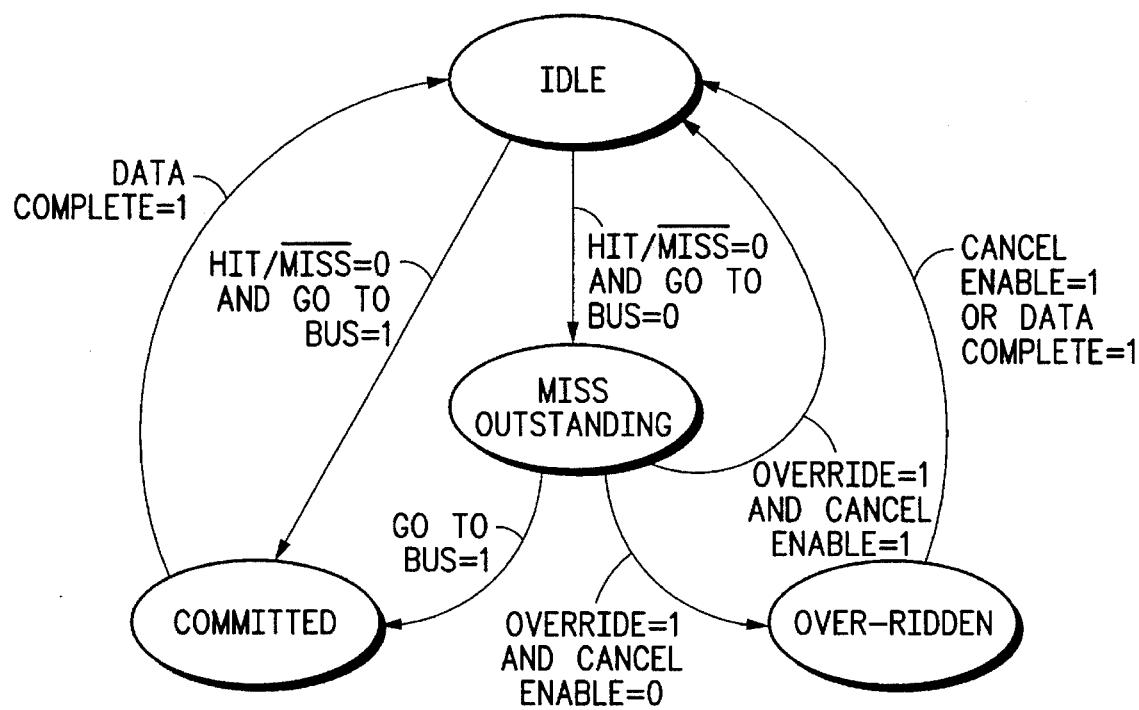
FIG. 5 depicts a state-transition diagram of the instruction cache logic unit depicted in FIG. 4.

FIG. 5 depicts a state-transition diagram of instruction cache logic unit 78 depicted in FIG. 4. ICACHE control logic unit 78 remains in the IDLE state until branch until 28 requests an instruction that is not in instruction cache 24, a "cache miss." After a cache "miss," instruction cache logic unit 78 will request a new instruction. ICACHE control logic unit 78 transitions to a MISS OUTSTANDING state if comparator 80 de-asserts HIT/$\overline{\text{MISS}}$ and speculative prefetch control unit 70 de-asserts GO TO BUS. Ultimately, instruction cache logic unit 78 will either commit to this request, if speculative prefetch control unit 70 asserts GO TO BUS, or will cancel the request, if speculative prefetch control unit 70 asserts OVERRIDE. It should be understood that, in some cases, main memory unit 16 will return an instruction to data processor 12 even after speculative prefetch control unit 70 asserts OVERRIDE. In these cases, ICACHE control logic unit 78 will ignore the instruction-data from main memory unit 16.

In those cases in which instruction cache logic unit 78 commits to a request, ICACHE control logic unit 78 transitions to a COMMITFED state from the MISS OUTSTANDING state when speculative prefetch control unit 70 asserts GO TO BUS. ICACHE control logic unit 78 may transition directly to the COMMITFED state from the IDLE state if comparator 80 de-asserts HIT/$\overline{\text{MISS}}$ and speculative prefetch control unit 70 asserts GO TO BUS. ICACHE control logic unit 78 transitions back to the IDLE state from the COMMITFED state if BIU 23 asserts DATA COMPLETE.

In those cases in which instruction cache logic unit 78 cancels a request, ICACHE control logic unit 78 will transition directly to the IDLE state from the MISS OUTSTANDING state if speculative prefetch control unit 70 asserts OVERRIDE and BIU 23 asserts CANCEL ENABLE. ICACHE control logic unit 78 will transition to an OVER-RIDDEN state from the MISS OUTSTANDING state when speculative prefetch control unit 70 asserts OVERRIDE and BIU 23 de-asserts CANCEL ENABLE. ICACHE control logic unit 78 transitions back to the IDLE state from the OVER-RIDDEN state if BIU 23 asserts CANCEL ENABLE or DATA COMPLETE.

The logic states of the control signals COMMIT and LOAD REQUEST are determined by the state-transition diagram depicted in FIG. 5. In particular, ICACHE control logic unit 78 asserts COMMIT when it is in the COMMYED state. Otherwise, ICACHE control logic unit 78 deasserts COMMIT. ICACHE control logic unit 78 asserts LOAD REQUEST when it is in any one of the MISS OUTSTANDING, COMMITTED, or OVER-RIDDEN states. ICACHE control logic unit 78 de-asserts LOAD REQUEST when it is in the idle state.

Figure 6:
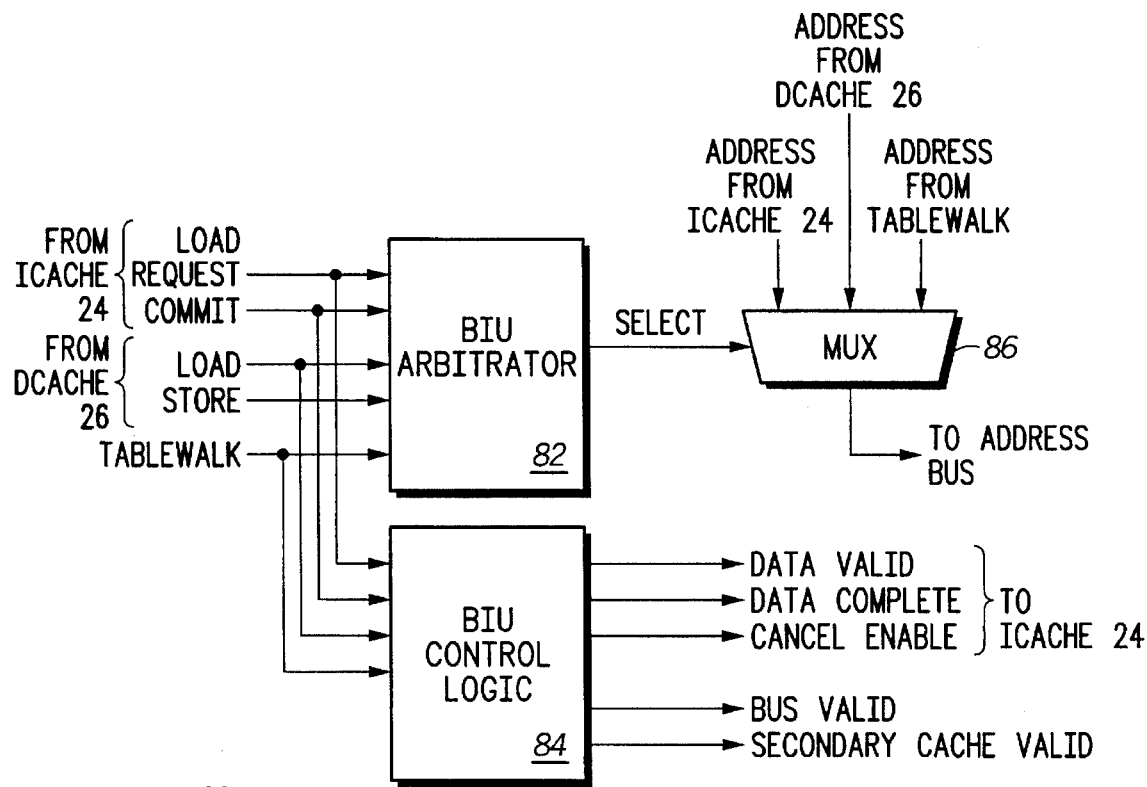
FIG. 6 depicts a block diagram of the bus interface unit depicted in FIG. 2.

FIG. 6 depicts a block diagram of BIU 23 depicted in FIG. 2. The portion of BIU 23 that is relevant to the disclosed invention has a BIU arbitrator 82, a BIU control logic unit 84 and a multiplexer (labeled "MUX") 86.

BIU arbitrator 82 receives requests for access to the external address and data buses from instruction cache 24, from data cache 26 and tablewalk circuitry (not shown) shared by both instruction and data caches. The tablewalk circuitry loads data into translations arrays 74 used for address translation purposes. BIU arbitrator 82 determines which request actually accesses the address and data buses at what time according to a protocol not relevant to the disclosed invention. BIU arbitrator generates a control signal SELECT that chooses which input to multiplexer 86 is forwarded to the address bus. A separate data path (not shown) routes data associated with a data cache load or store operation to the external data bus. Multiplexer 86 receives an address from each of the three possible requesters.

BIU control logic 84 receives the same three requests for access to the external address and data buses as does BIU arbitrator 82. BIU control logic 84 also receives control signals from and generates control signals related to the address and data buses. For instance, BIU control logic 84 generates a data valid signal output to the external buses, BUS VALID, and receives a similar signal from the external buses. BIU control logic unit 84 asserts BUS VALID when at least one of the three possible requesters makes a request. Also, if the selected requester originates from instruction cache 24, then both LOAD REQUEST and COMMIT must be asserted before BIU control logic unit 84 asserts BUS VALID. BIU control logic unit 84 forwards the data valid signal received from the external buses to instruction cache 24 as DATA VALID. BIU control logic unit 84 always asserts CANCEL ENABLE in the first embodiment of the disclosed invention. Finally, BIU control logic unit 84 asserts DATA COMPLETE when it receives the last data beat from the external buses.

As described above, the disclosed invention may be incorporated into a data processing system which has a data processor and an external cache accessed via a pair of buses distinct from the common pair of buses. In this case, certain signals and functions described above differ slightly. In particular, BIU control logic unit 84 first forwards the contents of IFAR 62 to external cache memory block 22 independent of the number of unresolved branch instructions in branch queue 68. It should be noted that instruction cache 24 has already searched for the instruction indexed by IFAR 62. Bus activity on this separate pair of buses does not greatly impact system performance. BIU control logic unit 84 asserts a control signal SECONDARY CACHE VALID during this step. If the instruction is not present in external cache memory block 22 (an "L2 miss"), then BIU control logic unit 84 will access main memory block 16 via the common buses as described above. BIU control logic unit 84 asserts CANCEL ENABLE after the data processor accesses the external cache.

Although the present invention has been described with reference to a specific embodiment, further modifications and improvements will occur to those skilled in the art. For instance, the disclosed invention may be incorporated into data processors traditionally classified as complex instruction set computers or CISC machines. Also, certain functional units may be omitted in certain embodiments or relocated to other areas of data processor 12. It is to be understood therefore, that the invention encompasses all such modifications that do not depart from the spirit and scope of the invention as defined in the appended claims.

What is claimed is:

1. A data processor with speculative instruction fetching for use with an external memory system, the data processor comprising:

a programmable register storing a first number representative of a maximum number of unresolved branch instructions beyond which said data processor may not fetch instructions;

a branch prediction unit coupled to said programmable register, said branch prediction unit generating a fetch address responsive to a sequence of programmed instructions regardless of the first number, said branch prediction unit storing a completion signal representative of a number of unresolved branch instructions, said branch prediction unit asserting a control signal if said completion signal is representative of a number of unresolved branch instructions less than or equal to said first number, said branch prediction unit de-asserting said control signal if said completion signal is representative of a number of unresolved branch instructions greater than said first number;

a cache memory storing a plurality of insreactions to be executed by the data processor, the cache memory outputting an instruction indexed by the fetch address if the instruction is stored in the cache memory regardless of the first number, an execution unit coupled to the cache memory, the execution unit executing the instruction indexed by the fetch address if the instruction is stored in the cache memory regardless of the first number; and an instruction fetch circuitry coupled to said branch prediction unit, said instruction fetch circuitry fetching the instruction from an external memory system if said branch prediction unit asserts said control signal and if the instruction is not stored in the cache memory.

2. The data processor of claim 1 wherein said branch prediction unit comprises:

a branch calculation circuitry generating a first and a second address responsive to a branch instruction within said sequence of programmed instructions;

a branch history table coupled to said branch calculation circuitry, said branch history table selecting said fetch address, said fetch address logically equivalent to a selected one of either of said first or second addresses; and a branch completion circuitry for storing said signal representative of said number of unresolved branch instructions.

3. The data processor of claim 2 wherein said branch completion circuitry further comprises circuitry for storing a one of either said first or second address not logically equivalent to said fetch address.

4. A method of operating a data processor with an external memory system, the method comprising the steps of:

receiving, in data processor, a first number representative of a maximum number of unresolved branch instructions beyond which the data processor may not fetch instructions;

receiving, in a branch prediction unit of the data processor, a branch instruction;

predicting, in the branch prediction unit, a fetch address responsive to the branch instruction regardless of the first number;

storing, in the in the data processor, a completion signal representative of a number of unresolved branch instructions;

generating, in the branch prediction unit, a control signal, the control signal corresponding to a first logic state if the number of unresolved branch instructions is less than or equal to the first number, the control signal corresponding to a second logic state if the number of unresolved branch instructions is greater than the first number;

first fetching an instruction indexed by the fetch address from a memory cache if the instruction is stored in the memory cache regardless of the first number;

executing the instruction in an execution unit of the data processor regardless of the first number; and second fetching, by an instruction fetch circuitry coupled to the branch prediction unit, the instruction from an external memory system responsive to the first logic state of the control signal and if the instruction is not stored in the memory cache.

5. A method of claim 4 wherein said step of predicting further comprises the steps of:

generating, in a branch calculation circuitry, a first and a second address responsive to the branch instruction; and selecting, by a branch history table coupled to the branch calculation circuitry, the fetch address logically equivalent to a selected one of either the first or second addresses.

6. The method of claim 5 wherein said step of storing further comprises storing a one of either the first or second addresses not logically equivalent to the fetch address.

* * * * *